US010805637B2

(12) United States Patent
Choi et al.

(10) Patent No.: US 10,805,637 B2
(45) Date of Patent: Oct. 13, 2020

(54) VIDEO ENCODING METHOD AND APPARATUS, VIDEO DECODING METHOD AND APPARATUS

(71) Applicant: SAMSUNG ELECTRONICS CO., LTD., Suwon-si (KR)

(72) Inventors: Min-seok Choi, Seoul (KR); Kwang-pyo Choi, Gwacheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/092,318

(22) PCT Filed: May 16, 2017

(86) PCT No.: PCT/KR2017/005050
§ 371 (c)(1),
(2) Date: Oct. 9, 2018

(87) PCT Pub. No.: WO2017/200259
PCT Pub. Date: Nov. 23, 2017

(65) Prior Publication Data
US 2019/0149844 A1    May 16, 2019

Related U.S. Application Data

(60) Provisional application No. 62/336,822, filed on May 16, 2016.

(51) Int. Cl.
*H04N 19/597* (2014.01)
*H04N 19/119* (2014.01)
(Continued)

(52) U.S. Cl.
CPC ......... *H04N 19/597* (2014.11); *H04N 19/119* (2014.11); *H04N 19/136* (2014.11); *H04N 19/176* (2014.11); *H04N 19/182* (2014.11)

(58) Field of Classification Search
CPC .. H04N 19/597; H04N 19/593; H04N 19/182; H04N 21/854; H04N 5/262;
(Continued)

(56) References Cited

U.S. PATENT DOCUMENTS 2,424,601 A    7/1947 Crouch
7,483,588 B2   1/2009 Park
(Continued)

FOREIGN PATENT DOCUMENTS

KR    10-2006-0050348 A    5/2006
KR    10-2006-0056050 A    5/2006
(Continued)

OTHER PUBLICATIONS

Search Report dated Aug. 17, 2017, issued by the International Searching Authority in International Application No. PCT/KR2017/005050 (PCT/ISA/210).
(Continued)

*Primary Examiner* — Dramos Kalapodas
(74) *Attorney, Agent, or Firm* — Sughrue Mion, PLLC

(57) ABSTRACT

Provided is a video encoding method including obtaining a projected image by projecting a three-dimensional image onto a polyhedron; generating a rectangular image including a first pixel region and a second pixel region, the first pixel region corresponding to the projected image; selecting a block including at least one pixel included in the first pixel region and at least one pixel included in the second pixel region, the block being from among blocks split from the rectangular image and each block having a predetermined size; substituting a pixel value of the at least one pixel included in the second pixel region included in the selected block with a predetermined value; and encoding the selected block.

13 Claims, 18 Drawing Sheets

(51) Int. Cl.
*H04N 19/176* (2014.01)
*H04N 19/182* (2014.01)
*H04N 19/136* (2014.01)

(58) Field of Classification Search
CPC .... H04N 19/119; H04N 19/50; H04N 19/169; H04N 19/176; H04N 19/82
See application file for complete search history.

(56) References Cited

U.S. PATENT DOCUMENTS

| | | | |
|---|---|---|---|
| 8,548,052 B2 | 10/2013 | Alshina et al. | |
| 2006/0034523 A1* | 2/2006 | Park | G06T 3/0062 |
| | | | 382/232 |
| 2007/0279494 A1* | 12/2007 | Aman | H04N 5/262 |
| | | | 348/169 |
| 2013/0044258 A1 | 2/2013 | Dennis | |
| 2014/0269899 A1* | 9/2014 | Park | H04N 19/44 |
| | | | 375/240.02 |
| 2015/0363976 A1 | 12/2015 | Henson | |
| 2015/0365682 A1 | 12/2015 | Amon et al. | |
| 2016/0012855 A1 | 1/2016 | Krishnan | |
| 2018/0007389 A1* | 1/2018 | Izumi | H04N 21/2343 |
| 2018/0014011 A1* | 1/2018 | He | H04N 19/105 |

FOREIGN PATENT DOCUMENTS

| | | | | |
|---|---|---|---|---|
| KR | 20060050348 A | * | 5/2006 | ........... G06T 3/0062 |
| KR | 10-2013-0107263 A | | 10/2013 | |
| KR | 10-2015-0092063 A | | 8/2015 | |
| WO | 2017/175888 A1 | | 10/2017 | |

OTHER PUBLICATIONS

Written Opinion dated Aug. 17, 2017, issued by the International Searching Authority in International Application No. PCT/KR2017/005050 (PCT/ISA/237).

* cited by examiner

FIG. 7
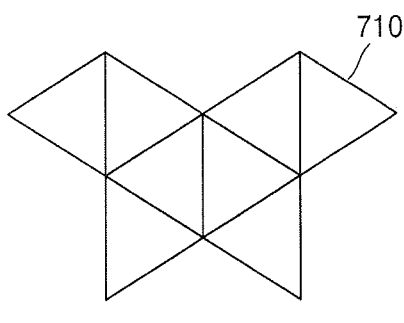
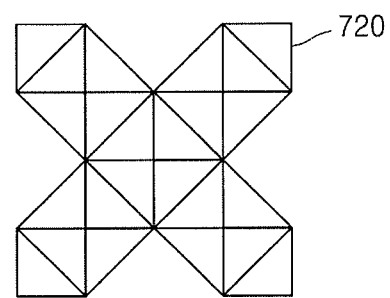
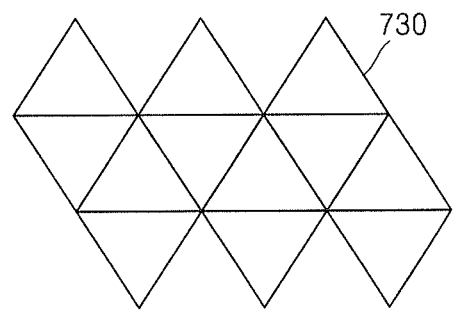
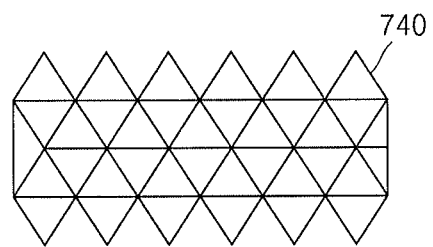

VIDEO ENCODING METHOD AND APPARATUS, VIDEO DECODING METHOD AND APPARATUS

TECHNICAL FIELD

The present disclosure relates to a video encoding method and apparatus, and a video decoding method and apparatus, and more particularly, to video encoding/decoding methods and apparatuses involving substituting a pixel value of a second pixel region with a predetermined value, except for a first pixel region corresponding to a projected image that is projected onto a polyhedron composed of triangles.

BACKGROUND ART

Due to recent developments in technology related to a virtual reality (VR), VR devices using the same are highlighted. The VR devices are widely applied to various fields including entertainment, education, office work, medical treatment, or the like.

A VR image displayed on a VR device moves according to eyes of a user who wears a VR display device, and therefore, the VR image has to include all surrounding images around the user. That is, the VR image provided by the VR device is a 360-degree image of all surrounding directions around the user. Therefore, along with an interest in VR devices, an interest in processing of such a 360-degree image is also increased.

A method of processing a 360-degree image according to the related art includes projecting the 360-degree image onto a quadrangle shape so as to store, process, and encode the 360-degree image. However, when an image is projected onto a quadrangle shape, the number of redundant pixels is increased such that an image size is increased and processing efficiency is decreased. Therefore, there is a demand for an image processing method and apparatus for further efficiently providing a high-quality image.

DESCRIPTION OF EMBODIMENTS

Technical Problem

Provided are video encoding/decoding methods and apparatuses capable of improving coding efficiency by processing an image projected onto a polyhedron composed of triangles.

Solution to Problem

According to an aspect of the present disclosure, a video encoding method includes obtaining a projected image by projecting a three-dimensional image onto a polyhedron; generating a rectangular image including a first pixel region and a second pixel region, the first pixel region corresponding to the projected image; selecting a block including at least one pixel included in the first pixel region and at least one pixel included in the second pixel region, the block being from among blocks split from the rectangular image and each block having a predetermined size; substituting a pixel value of the at least one pixel included in the second pixel region included in the selected block with a predetermined value; and encoding the selected block.

According to another aspect of the present disclosure, a video encoding apparatus includes an obtainer configured to obtain a projected image by projecting a three-dimensional image to a polyhedron; a generator configured to generate a rectangular image including a first pixel region and a second pixel region, the first pixel region corresponding to the projected image; and an encoder configured to select a block including at least one pixel included in the first pixel region and at least one pixel included in the second pixel region, the block being from among blocks split from the rectangular image and each block having a predetermined size, to substitute a pixel value of the at least one pixel included in the second pixel region included in the selected block with a predetermined value, and to encode the selected block.

According to another aspect of the present disclosure, a video decoding method includes extracting, from a parsed bitstream, encoded image data of each of blocks each having a predetermined size; decoding the image data of a block including at least one pixel included in a first pixel region and at least one pixel included in a second pixel region; reconstructing a rectangular image including the first pixel region and the second pixel region; and reconstructing a three-dimensional image by rendering a projected image corresponding to the first pixel region included in the rectangular image.

According to another aspect of the present disclosure, a video decoding apparatus includes an extractor configured to extract, from a parsed bitstream, encoded image data of each block having a predetermined size; a decoder configured to decode the image data of a block including at least one pixel included in a first pixel region and at least one pixel included in a second pixel region, and to reconstruct a rectangular image including the first pixel region and the second pixel region; and a reconstructor configured to reconstruct a three-dimensional image by rendering a projected image corresponding to the first pixel region included in the rectangular image.

Advantageous Effects of Disclosure

According to video encoding/decoding methods and apparatuses of the present disclosure, a compression rate and an image quality in rendering may be improved by processing an image projected onto a polyhedron composed of triangles.

BRIEF DESCRIPTION OF DRAWINGS

FIG. 7 is a diagram illustrating projected images obtained according to various embodiments.

BEST MODE

Figure 1:
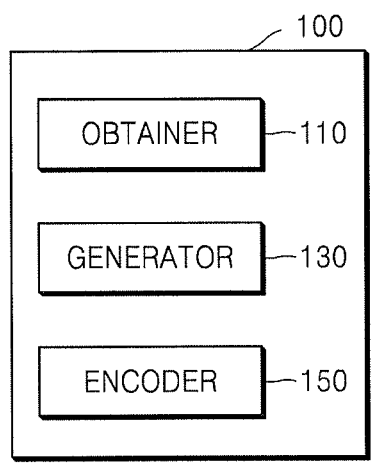
FIG. 1 is a diagram illustrating a video encoding apparatus, according to an embodiment.

According to an aspect of the present disclosure, a video encoding method includes obtaining a projected image by projecting a three-dimensional image onto a polyhedron; generating a rectangular image including a first pixel region and a second pixel region, the first pixel region corresponding to the projected image; selecting a block including at least one pixel included in the first pixel region and at least one pixel included in the second pixel region, the block being from among blocks split from the rectangular image and each block having a predetermined size; substituting a pixel value of the at least one pixel included in the second pixel region included in the selected block with a predetermined value; and encoding the selected block.

The video encoding method may further include skipping encoding with respect to a block including only pixels included in the second pixel region.

The substituting of the pixel value of the at least one pixel included in the second pixel region included in the selected block with the predetermined value may include searching for a first pixel included in the first pixel region, the first pixel being located in a predetermined direction from a second pixel included in the second pixel region included in the selected block; and substituting a pixel value of the second pixel with a pixel value of the first pixel.

The predetermined direction may be determined only with respect to the selected block.

The searching for the first pixel may include sequentially scanning for pixels arranged in the predetermined direction from the second pixel, and determining a first found pixel in the first pixel region to be the first pixel.

The searching for the first pixel may include sequentially scanning for pixels arranged in the predetermined direction from the second pixel, and determining a weighted sum of a first found pixel and a plurality of pixels to be a pixel value of the first pixel, wherein the first found pixel is included in the first pixel region and the plurality of pixels are adjacent to the first found pixel in the predetermined direction in the first pixel region.

The searching for the first pixel may include scanning for pixels in at least two directions from the second pixel, and determining one of pixels to be the first pixel, the pixels being first found in the at least two directions in the first pixel region.

The searching for the first pixel may include scanning for pixels in at least two directions from the second pixel, and determining an average value of pixels to be the pixel value of the first pixel, the pixels being first found in the at least two directions in the first pixel region.

The obtaining of the projected image by projecting the three-dimensional image onto the polyhedron may include obtaining the projected image by projecting the three-dimensional image onto a flat pattern view of the polyhedron.

The obtaining of the projected image by projecting the three-dimensional image onto the polyhedron may include obtaining the projected image by projecting the three-dimensional image onto the polyhedron and then projecting images projected onto the polyhedron onto at least one flat surface outside of the polyhedron.

The polyhedron may include a polyhedron composed of at least one triangle.

According to another aspect of the present disclosure, a video encoding apparatus includes an obtainer configured to obtain a projected image by projecting a three-dimensional image to a polyhedron; a generator configured to generate a rectangular image including a first pixel region and a second pixel region, the first pixel region corresponding to the projected image; and an encoder configured to select a block including at least one pixel included in the first pixel region and at least one pixel included in the second pixel region, the block being from among blocks split from the rectangular image and each block having a predetermined size, to substitute a pixel value of the at least one pixel included in the second pixel region included in the selected block with a predetermined value, and to encode the selected block.

The encoder may be further configured to skip encoding with respect to a block including only pixels included in the second pixel region.

The encoder may be further configured to search for a first pixel included in the first pixel region, the first pixel being located in a predetermined direction from a second pixel included in the second pixel region included in the selected block, and to substitute a pixel value of the second pixel with a pixel value of the first pixel.

According to another aspect of the present disclosure, a video decoding method includes extracting, from a parsed bitstream, encoded image data of each of blocks each having a predetermined size; decoding the image data of a block including at least one pixel included in a first pixel region and at least one pixel included in a second pixel region; reconstructing a rectangular image including the first pixel region and the second pixel region; and reconstructing a three-dimensional image by rendering a projected image corresponding to the first pixel region included in the rectangular image.

According to another aspect of the present disclosure, a video decoding apparatus includes an extractor configured to extract, from a parsed bitstream, encoded image data of each block having a predetermined size; a decoder configured to decode the image data of a block including at least one pixel included in a first pixel region and at least one pixel included in a second pixel region, and to reconstruct a rectangular image including the first pixel region and the second pixel region; and a reconstructor configured to reconstruct a three-dimensional image by rendering a projected image corresponding to the first pixel region included in the rectangular image.

MODE OF DISCLOSURE

Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those of ordinary skill in the art.

Hereinafter, terms that are used in the specification will be briefly described, and the present disclosure will be described in detail.

All terms including descriptive or technical terms which are used herein should be construed as having meanings that are obvious to one of ordinary skill in the art. However, the terms may have different meanings according to an intention of those of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

Throughout the specification, the singular forms "a," "an," and "the" may include the plural forms as well, unless the context clearly indicates otherwise.

Throughout the specification, when a part "includes" or "comprises" an element, unless there is a particular description contrary thereto, the part may further include other elements, not excluding the other elements. The term 'unit', as used in the specification, means, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

Embodiments of the present disclosure will now be described more fully with reference to the accompanying drawings for one of ordinary skill in the art to be able to perform the present disclosure without any difficulty. In addition, portions irrelevant to the description of the present disclosure will be omitted in the drawings for a clear description of the present disclosure.

FIG. 1 is a diagram illustrating a video encoding apparatus 100, according to an embodiment.

As illustrated in FIG. 1, the video encoding apparatus 100 includes an obtainer 110, a generator 130, and an encoder 150. Elements of the video encoding apparatus 100 may perform a video encoding method according to various embodiments to be particularly described below with reference to FIGS. 2 to 16. Therefore, redundant descriptions will be briefly provided.

The obtainer 110 may obtain a projected image by projecting a three-dimensional image onto a polyhedron. The three-dimensional image according to an embodiment will be described below with reference to FIG. 3. The obtainment of the projected image according to various embodiments will be described below with reference to FIGS. 4 to 7.

The generator 130 may generate a rectangular image including a first pixel region corresponding to the projected image and a second pixel region other than the first pixel region. The rectangular image including the first pixel region and the second pixel region according to an embodiment will be described below with reference to FIGS. 8 and 9.

The encoder 150 may select a block including at least one pixel included in the first pixel region and at least one pixel included in the second pixel region, the block being from among blocks split from a rectangular image and each block having a predetermined size, may substitute a pixel value of the at least one pixel included in the second pixel region included in the selected block with a predetermined value, and may encode the selected block.

According to an embodiment, the encoder 150 may search for a first pixel included in the first pixel region, the first pixel being located in a predetermined direction from a second pixel included in the second pixel region included in the selected block, and may substitute a pixel value of the second pixel with a pixel value of a found first pixel.

According to an embodiment, the encoder 150 may sequentially scan for pixels arranged in a predetermined direction from the second pixel, and may determine a first found pixel in the first pixel region to be the first pixel.

According to another embodiment, the encoder 150 may sequentially scan for the pixels arranged in the predetermined direction from the second pixel, and may determine a weighted sum of the first found pixel and a plurality of pixels to be a pixel value of the first pixel, wherein the first found pixel is included in the first pixel region and the plurality of pixels are adjacent to the first found pixel in the predetermined direction in the first pixel region.

According to another embodiment, the encoder 150 may scan for pixels in at least two directions from the second pixel, and may determine one of pixels to be the first pixel, the pixels being first found in the at least two directions in the first pixel region.

According to another embodiment, the encoder 150 may scan for pixels in at least two directions from the second pixel, and may determine an average value of pixels to be the pixel value of the first pixel, the pixels being first found in the at least two directions in the first pixel region.

According to an embodiment, the video encoding apparatus 100 may include, as elements, a random-access memory (RAM) to store a signal or data input from an outer source or to be used as a storage area corresponding to various operations performed by an electronic device, a read-only memory (ROM) storing a control program to control peripheral devices, and a processor. The processor may be embodied as a system on chip (SoC) that is integration of a core and a graphics processing unit (GPU). Also, the processor may include a plurality of processors.

Figure 2:
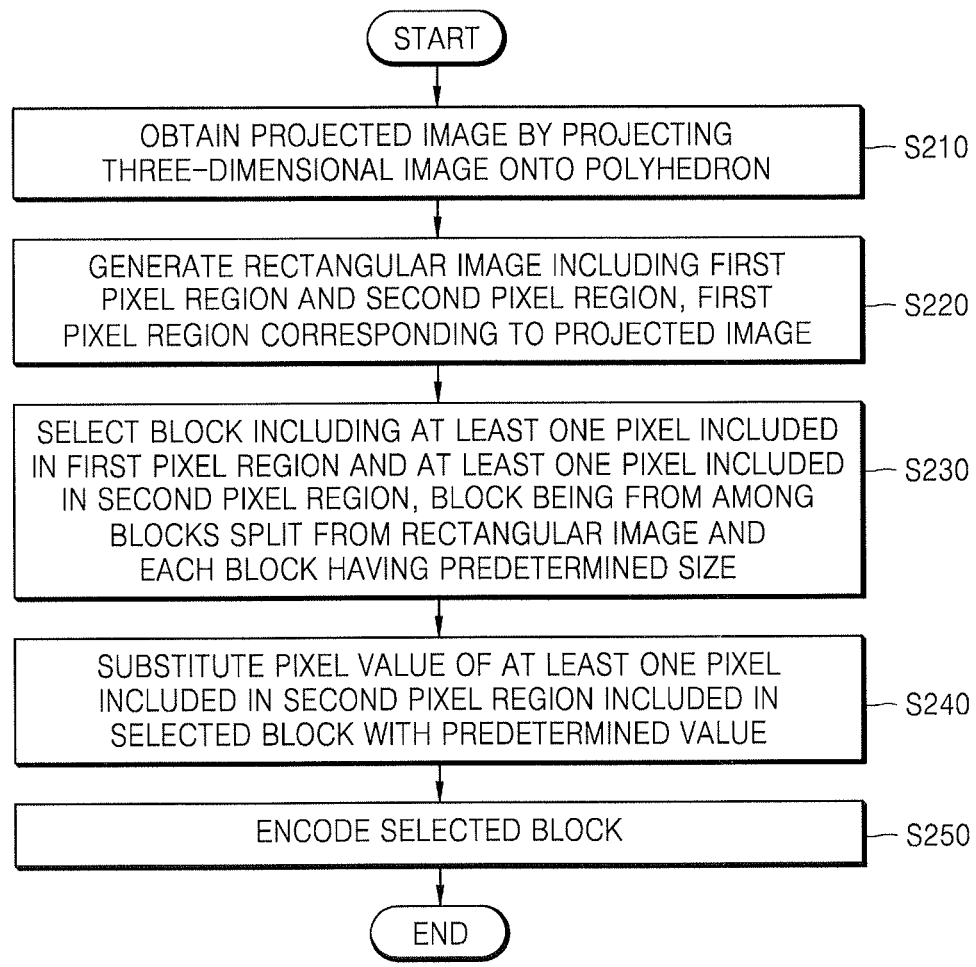
FIG. 2 is a flowchart of a video encoding method, according to an embodiment.

FIG. 2 is a flowchart of a video encoding method, according to an embodiment.

Figure 3:
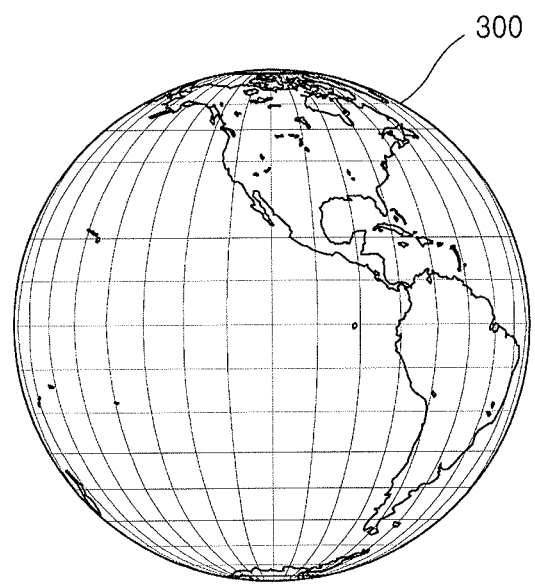
FIG. 3 is a diagram illustrating a three-dimensional image, according to an embodiment.

Referring to FIG. 2, in operation S210, the obtainer 110 of the video encoding apparatus 100 may obtain a projected image by projecting a three-dimensional image onto a polyhedron. According to an embodiment, the video encoding apparatus may obtain the three-dimensional image by capturing an image of a surrounding environment around the video encoding apparatus by using a camera. In this regard, the video encoding apparatus may capture the image of the surrounding environment around the video encoding apparatus by using at least one camera. According to an embodiment, the camera may be an element included in the video encoding apparatus, or may be embodied as a device separate from the video encoding apparatus. Also, the video encoding apparatus may capture the image of the surrounding environment in a panoramic manner by using the camera, and may capture an image of each of front, rear, left, right, up, and down directions from a specific position such as a position of a user. The video encoding apparatus 100 may receive a three-dimensional image from an external device. FIG. 3 illustrates the three-dimensional image according to an embodiment which is related to operation S210.

FIG. 3 is a diagram illustrating a three-dimensional image, according to an embodiment.

As illustrated in FIG. 3, a three-dimensional image 300 may be a sphere-shape image. The three-dimensional image 300 may be an image of a surrounding environment encircling a specific position in 360 degrees from the specific position. When a user wears a virtual reality device, an image of surrounding environment encircling the user in 360 degrees within a virtual reality may be a 360-degree image. The 360-degree image is provided to the user, and when the user wearing the virtual reality device moves within the virtual reality or turns away his/her eyes, an appropriate image therefor may be provided.

Referring back to FIG. 2, in operation S210, the obtainer 110 of the video encoding apparatus 100 may obtain a projected image by projecting the three-dimensional image onto a polyhedron. According to an embodiment, the polyhedron may be a polyhedron composed of at least one triangle. According to an embodiment, the projected image may be obtained by projecting the three-dimensional image onto a flat pattern view of the polyhedron. According to another embodiment, the three-dimensional image may be projected onto the polyhedron, and then images projected onto the polyhedron may be projected onto at least one flat surface in the outside of the polyhedron, such that a projected image may be obtained. FIGS. 4 to 7 illustrate projected images according to various embodiments which are obtained in operation S210.

Figure 4:
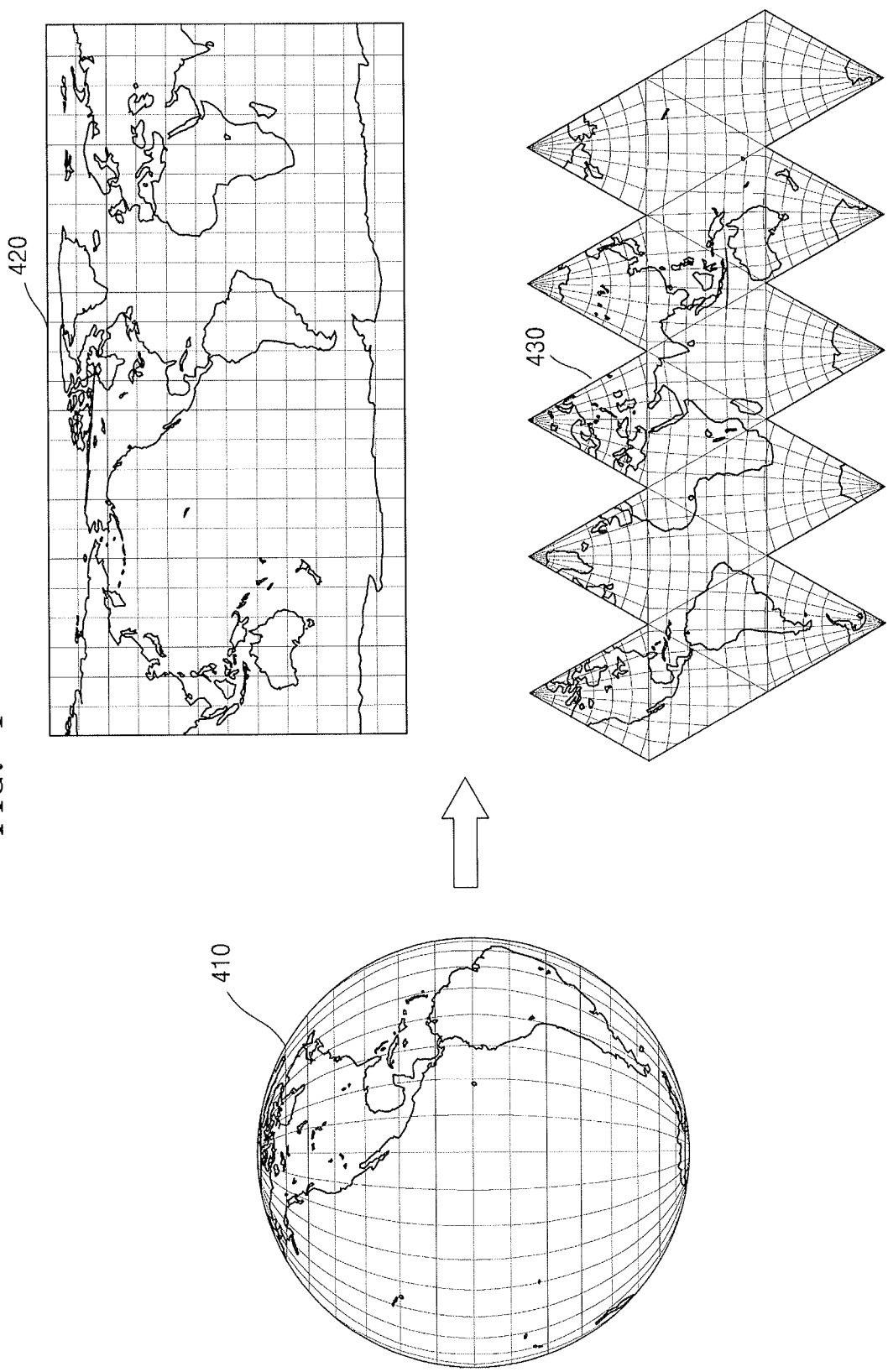
FIG. 4 is a diagram illustrating projection of a three-dimensional image, according to the related art and an embodiment.

FIG. 4 is a diagram illustrating projection of a three-dimensional image, according to the related art and an embodiment.

Referring to FIG. 4, a three-dimensional image 410 that may be a sphere-shape image may be obtained. According to the related art, a rectangular-shape projected image 420 may be obtained. In this case, as described above, the number of redundant pixels is increased such that a size of an image is increased, distortion may occur, and processing efficiency may be decreased. Accordingly, it may be considered to project a three-dimensional image onto a polyhedron such as a regular octahedron, a regular dodecahedron, a regular icosahedron, or the like, and for example, as illustrated in FIG. 4, a projected image 430 may be obtained by projecting the three-dimensional image 410 onto a flat pattern view of a regular icosahedron.

Figure 5:
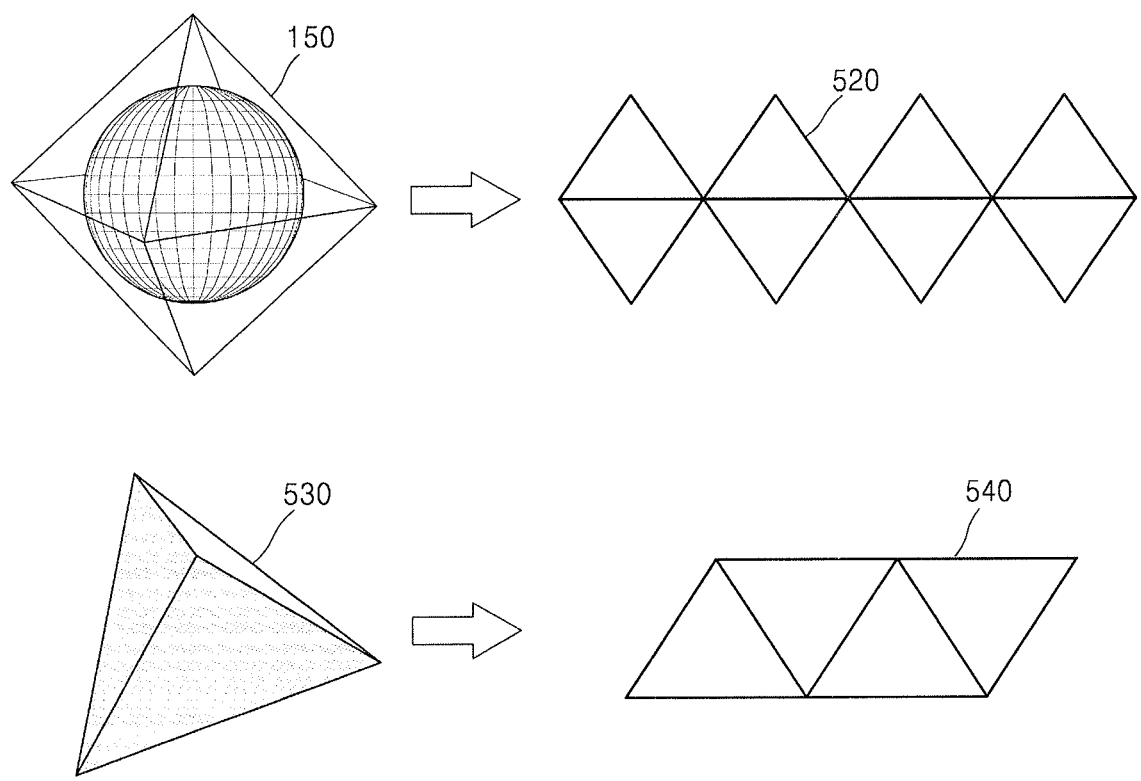
FIG. 5 is a diagram illustrating obtainment of a projected image, according to an embodiment.

FIG. 5 is a diagram illustrating obtainment of a projected image, according to an embodiment.

As illustrated in FIG. 5, the projected image may be obtained by projecting a three-dimensional image by using a regular octahedron 510 or a regular tetrahedron 530, instead of using a regular icosahedron as a polyhedron. As illustrated in FIG. 5, a projected image 520 may be obtained by using a flat pattern view of the regular octahedron 510, or a projected image 540 may be obtained by using a flat pattern view of the regular tetrahedron 530.

Figure 6:
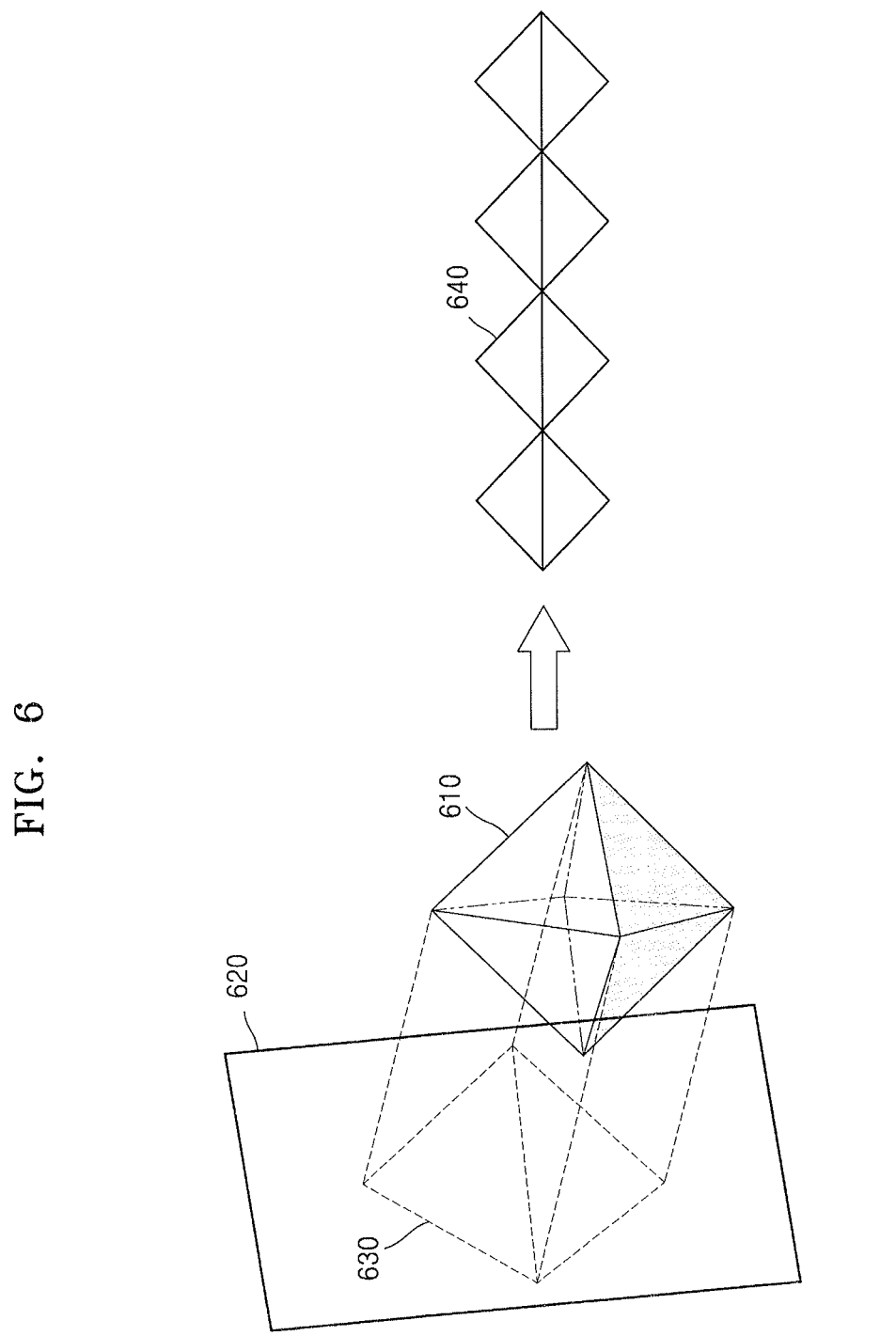
FIG. 6 is a diagram illustrating obtainment of a projected image, according to another embodiment.

FIG. 6 is a diagram illustrating obtainment of a projected image, according to another embodiment.

According to an embodiment, a three-dimensional image may be projected onto a polyhedron, and then images projected onto the polyhedron may be projected onto at least one flat surface in the outside of the polyhedron, such that a projected image may be obtained. For example, as illustrated in FIG. 6, a three-dimensional image may be projected onto a regular tetrahedron 610, and images of two sides in one direction from among images projected onto the regular tetrahedron 610 may be projected again onto a flat surface 620 in the outside of the regular tetrahedron 610, such that a projection drawing 630 may be obtained. As a result, as illustrated in FIG. 6, a projected image 640 having four projection drawings may be obtained. However, projecting of images onto at least one flat surface in the outside of a polyhedron is not limited to the embodiment of FIG. 6, and thus may vary.

FIG. 7 is a diagram illustrating projected images obtained according to various embodiments.

As illustrated in FIG. 7, a projected image 710 may be obtained by using a flat pattern view of a regular octahedron, a projected image 720 may be obtained by using a flat pattern view of a regular hexahedron, a projected image 720 may be obtained by using a flat pattern view of a hexahedron, and a projected image 740 may be obtained by using a flat pattern view of an octadecahedron. According to an embodiment, polyhedrons may each be a polyhedron composed of at least one triangle. One face of a polyhedron may be another polygon composed of at least two triangles. According to an embodiment, the present disclosure is not limited to polyhedrons illustrated in FIG. 7, and a projected image may be obtained by using polyhedrons having various shapes.

Figure 8:
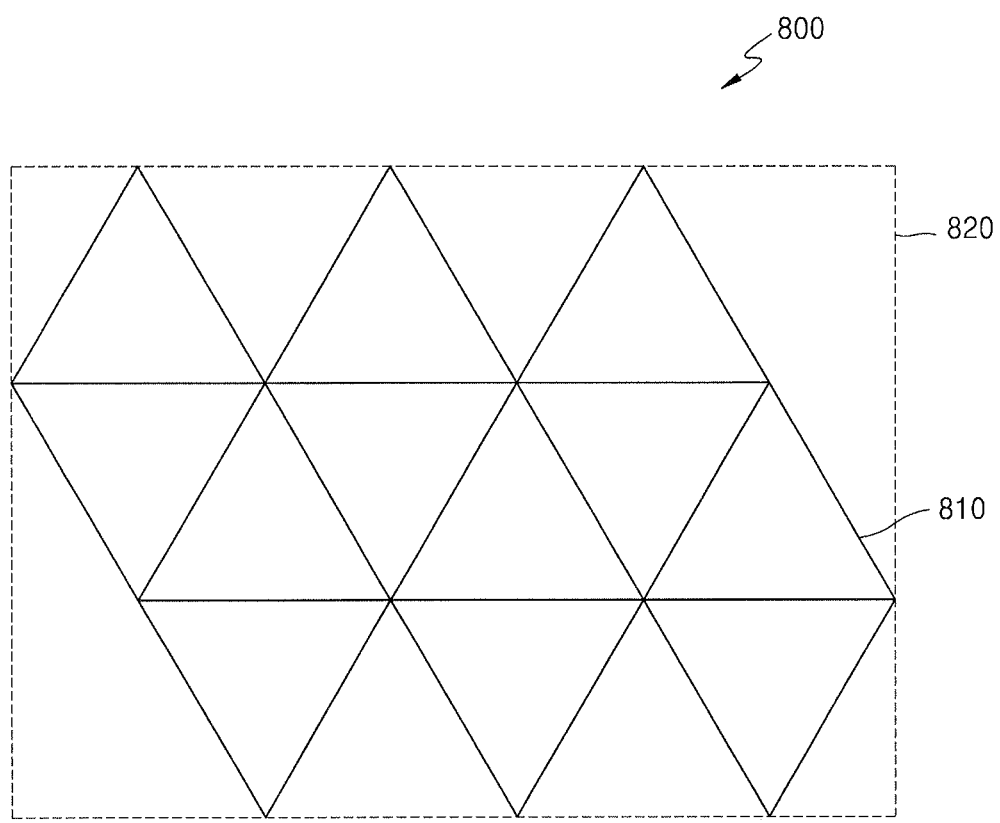
FIG. 8 is a diagram illustrating a generated rectangular image including a first pixel region and a second pixel region, according to an embodiment.
Figure 9:
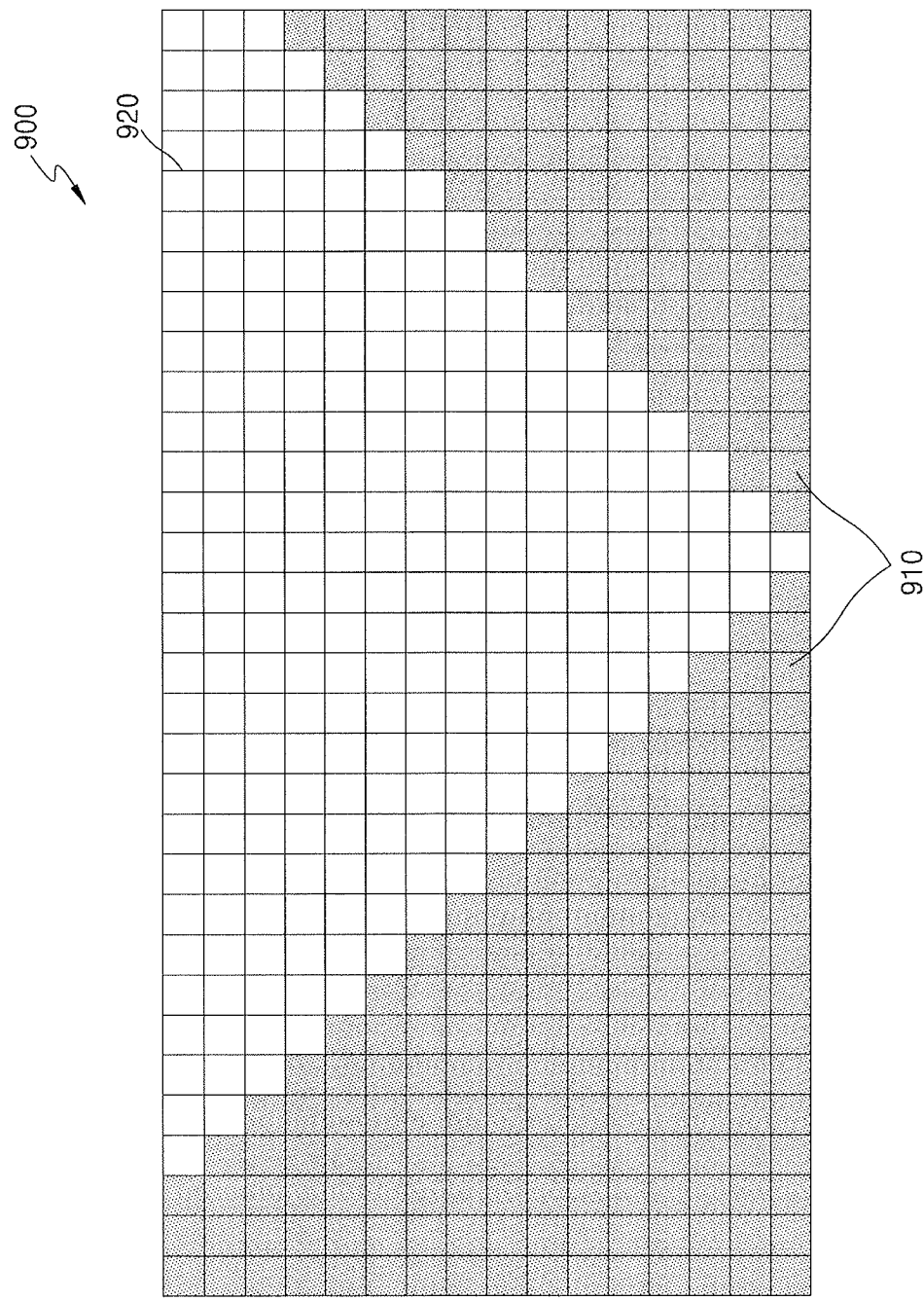
FIG. 9 is a diagram illustrating a magnified portion of a rectangular image, according to an embodiment.

Referring back to FIG. 2, in operation S220, the generator 130 of the video encoding apparatus 100 may generate a rectangular image including a first pixel region and a second pixel region, the first pixel region corresponding to the projected image. FIGS. 8 and 9 illustrate the rectangular image generated in operation S220.

FIG. 8 is a diagram illustrating a generated rectangular image including a first pixel region and a second pixel region, according to an embodiment.

As illustrated in FIG. 8, a rectangular image 800 may include a first pixel region 810 illustrated using a solid line and a second pixel region 820 illustrated using a broken line in a periphery of the first pixel region 810. The first pixel region 810 may correspond to a projected image obtained by using a flat pattern view of a regular hexahedron described with reference to FIG. 7.

When the projected image is obtained by projecting a three-dimensional image onto a polyhedron, the obtained projected image may be in a shape including a plurality of triangles. In this case, when the projected image is unfolded to be a two-dimensional image with a flat shape, empty spaces are generated between the plurality of triangles, and the empty spaces may be a problem when the projected image is rendered back to the three-dimensional image. Also, when a triangular-shape sharp edge is processed by using codec, a compression rate may be decreased and image quality may deteriorate.

Thus, in a case where, as illustrated in FIG. 8, the rectangular image including not only the first pixel region corresponding to the projected image but also including the second pixel region is generated, and then, as will be described below, a pixel value of the second pixel region is appropriately filled, it is possible to solve a problem in which joints between the triangles are obvious when the projected image is rendered to a 360-degree image.

In the present disclosure, the rectangular image may be substituted with a square image according to a shape of the obtained projected image and a shape of the first pixel region corresponding thereto, and shapes of the first pixel region and second pixel region are not limited to the embodiment of FIG. 8 and thus may vary.

FIG. 9 is a diagram illustrating a magnified portion of a rectangular image, according to an embodiment.

Referring to FIG. 9, a portion 900 of a rectangular image may consist of a first pixel region 910 including shaded pixels and a second pixel region 920 including not-shaded pixels. According to an embodiment, when the rectangular image is generated, all pixels included in the second pixel region 920 may not have a value or may be set as 0 or a predetermined value that is not 0.

Various embodiments of the present disclosure to be described below with reference to FIGS. 10 to 16 will be described by using the portion 900 of the rectangular image illustrated in FIG. 9, for convenience of descriptions, and processing of other portions of the rectangular image which are not illustrated may be performed in a same manner with respect to the portion 900 of the rectangular image.

Figure 10:
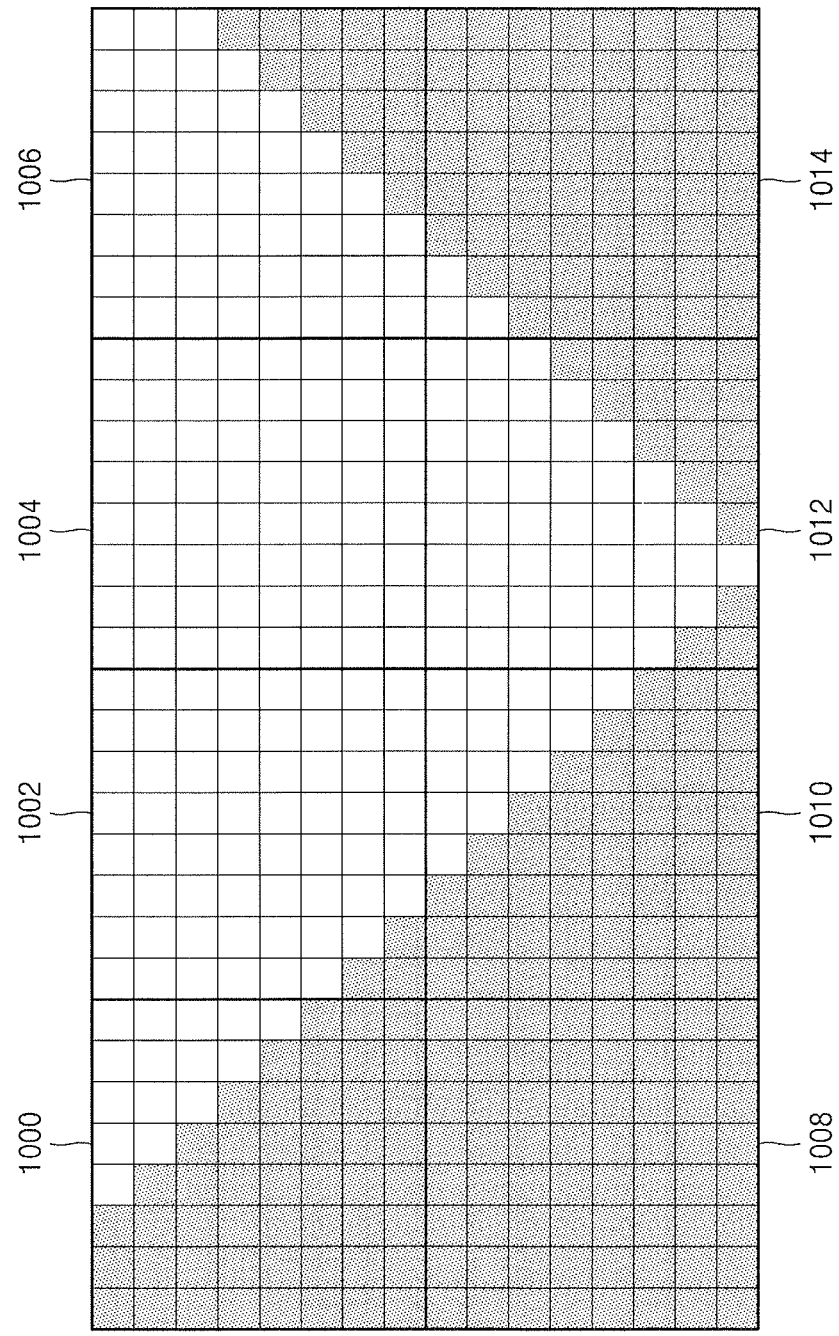
FIG. 10 is a diagram illustrating blocks split from a rectangular image and each block having a predetermined size, according to an embodiment.

Referring back to FIG. 2, in operation S230, the encoder 150 of the video encoding apparatus 100 may select a block including at least one pixel included in the first pixel region and at least one pixel included in the second pixel region, the block being from among blocks split from the rectangular image and each block having a predetermined size. FIG. 10 illustrates the blocks that are split from the rectangular image and each block have the predetermined size, and a block that is selected from among the blocks, in relation to operation S230.

FIG. 10 is a diagram illustrating the blocks split from the rectangular image and each block having the predetermined size, according to an embodiment.

As illustrated in FIG. 10, the rectangular image may be split into blocks 1000, 1002, 1004, 1006, 1008, 1010, 1012, and 1014, each block having a size of 8×8 pixels. According to an embodiment, a size of a block may be variously determined, and sizes of the blocks may be different.

With respect to the block selected in operation S230, referring to FIG. 10, except for the block 1008 including only pixels included in the first pixel region and a block 1004 including only pixels included in the second pixel region, other blocks 1000, 1002, 1006, 1010, 1012, and 1014 include at least one pixel included in the first pixel region and at least one pixel included in the second pixel region. Thus, the other blocks 1000, 1002, 1006, 1010, 1012, and 1014, except for the two blocks 1004 and 1008, may be selected.

Referring back to FIG. 2, in operations S240 and S250, the encoder 150 of the video encoding apparatus 100 may substitute a pixel value of the at least one pixel included in the second pixel region included in the selected block with a predetermined value, and may encode the selected block. FIGS. 11 to 17 illustrate various embodiments in which the pixel value of at least one pixel included in the second pixel region included in the selected block with a predetermined value.

Figure 11:
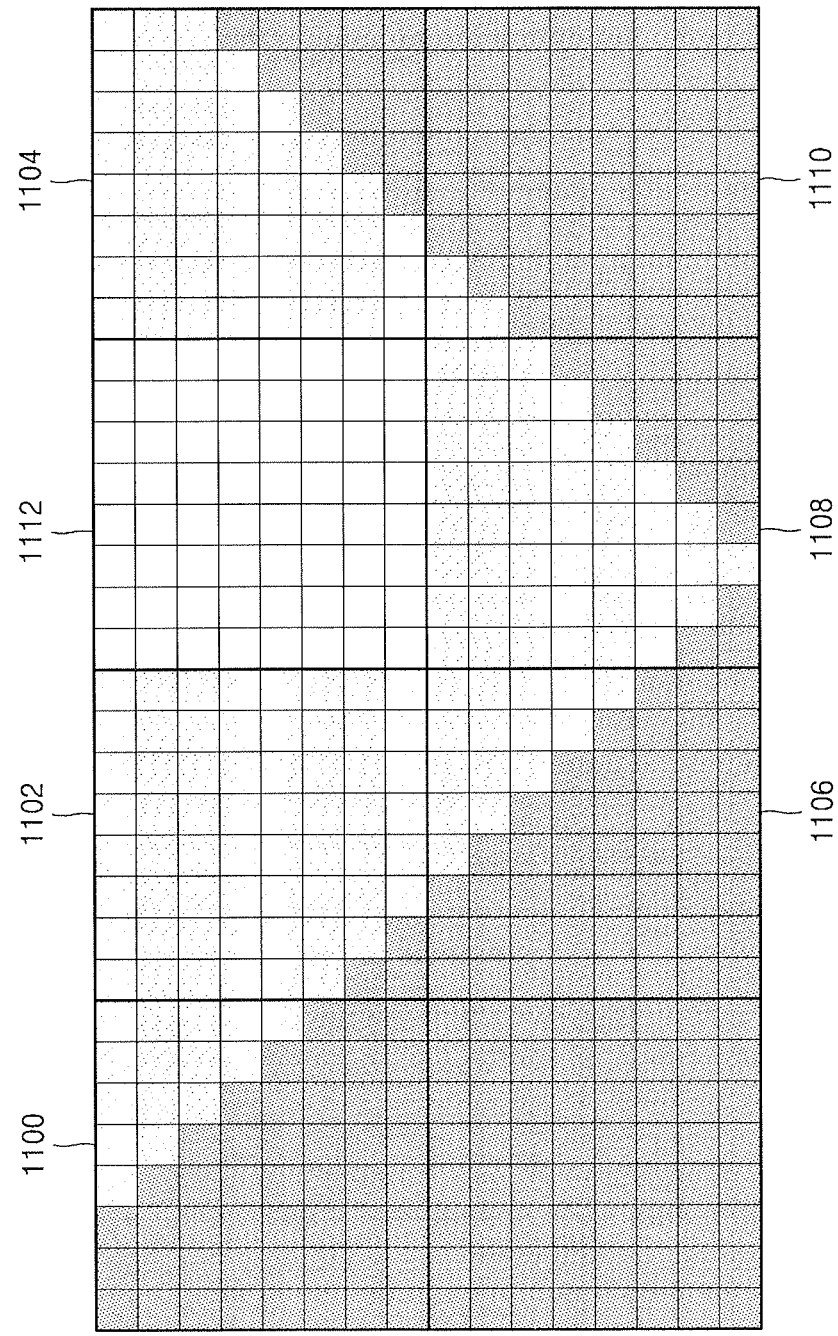
FIG. 11 is a diagram illustrating selected blocks in which pixel values of pixels included in a second pixel region are substituted, according to an embodiment.

FIG. 11 is a diagram illustrating selected blocks in which pixel values of pixels included in a second pixel region are substituted, according to an embodiment.

As illustrated in FIG. 11, pixel values of all pixels included in the second pixel region included in selected blocks 1100, 1102, 1104, 1106, 1108, and 1110 may be substituted with a predetermined value. A block 1112 includes only pixels included in the second pixel region and does not include a pixel included in a first pixel region, therefore, pixel values of the pixels included in the second pixel region may not be substituted with the predetermined value.

According to an embodiment, encoding with respect to the block 1112 including only the pixels included in the second pixel region may be skipped. The pixels included in the block 1112 may be processed as empty pixels not having a pixel value, or may be set as 0 or a predetermined value that is not 0. The block 1112 is processed as a skip block, and a change in pixel values does not occur on a time axis, therefore, the number of bits may be saved in encoding/decoding. The encoder 150 may encode information indicating whether the block 1112 includes only the pixels included in the second pixel region, and may add the information to a bitstream.

Pixel values of a block unit that is a block having pixels in a second pixel region are substituted with a predetermined value, therefore, when an image is encoded, superiority in an image quality and a bit rate may be expected, and because a sharp edge is not included in the image, encoding efficiency may be increased.

According to an embodiment, operation S240 of substituting the pixel value of at least one pixel included in the second pixel region included in the selected block with the predetermined value may include an operation of searching for a first pixel included in the first pixel region, the first pixel being located in a predetermined direction from a second pixel included in the second pixel region included in the selected block, and an operation of substituting a pixel value of the second pixel with a pixel value of a found first pixel. According to an embodiment, the predetermined direction may be determined only with respect to the selected block.

Figure 12:
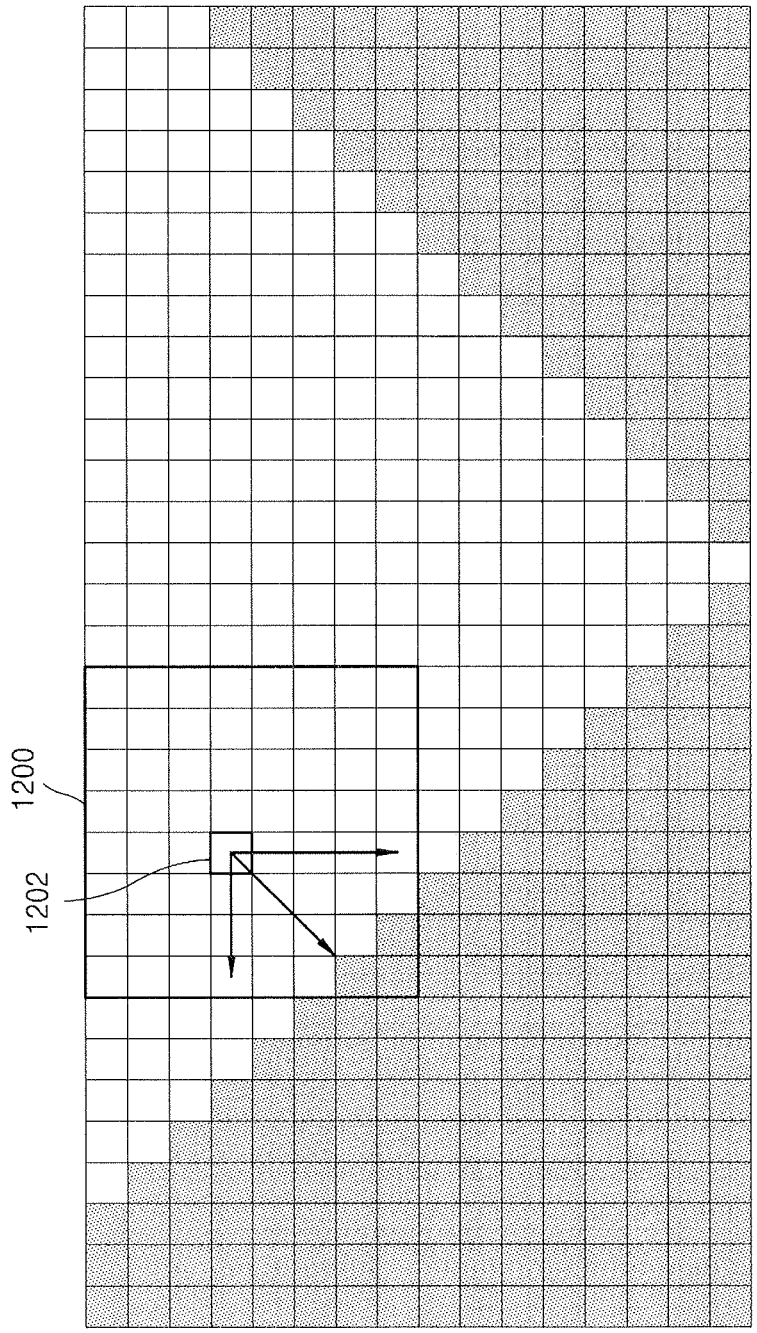
FIG. 12 is a diagram illustrating that a first pixel included in a first pixel region is searched for, according to an embodiment.
Figure 13:
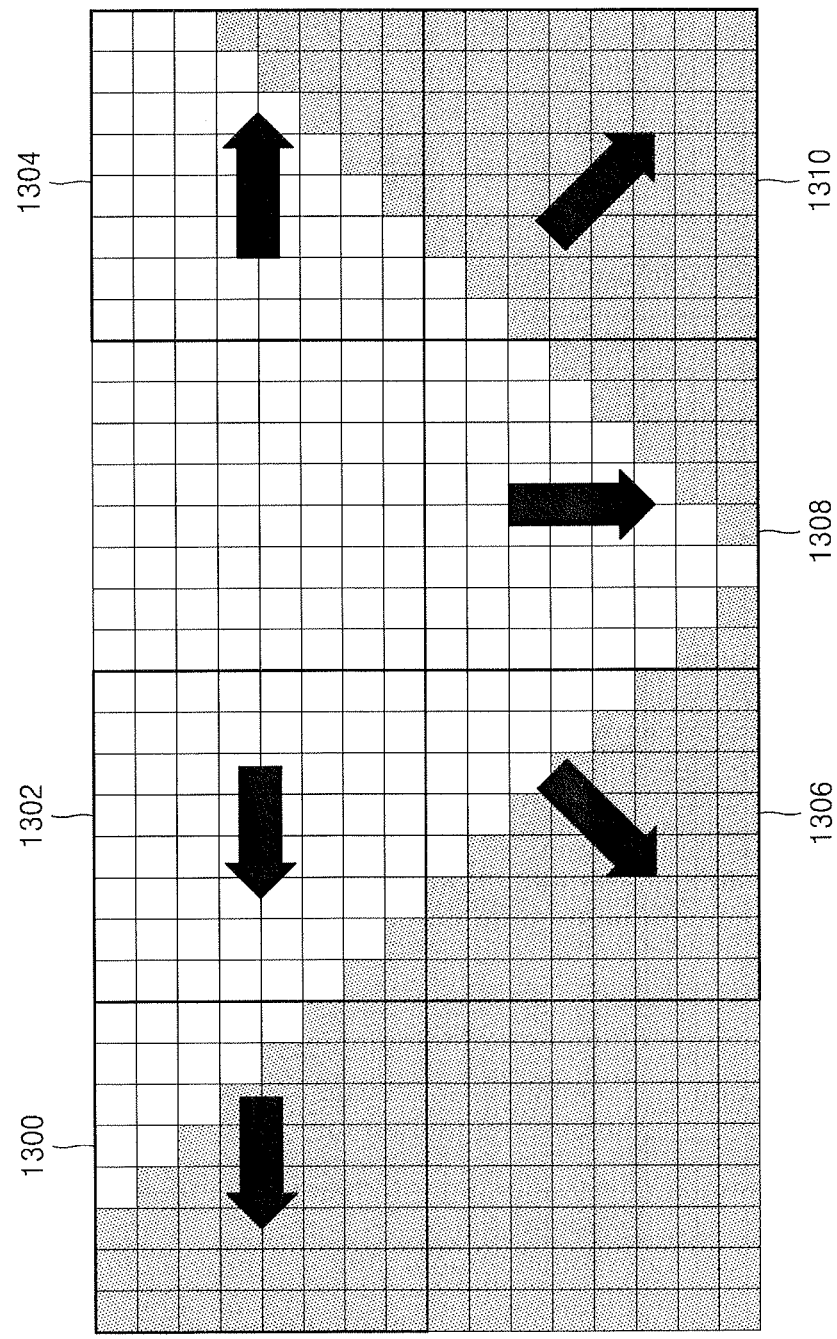
FIG. 13 is a diagram illustrating that predetermined directions with respect to searching for a first pixel are separately determined, according to an embodiment.

FIG. 12 is a diagram illustrating that a first pixel included in a first pixel region is searched for, according to an embodiment, and FIG. 13 is a diagram illustrating that predetermined directions with respect to searching for a first pixel are separately determined, according to an embodiment.

As illustrated in FIG. 12, a selected block 1200 may include a second pixel 1202 included in a second pixel region, and a first pixel included in a first pixel region may be searched for in a predetermined direction that may be one of a left direction, a lower left direction, and a down direction from the selected block 1200. The predetermined direction with respect to searching for the first pixel is not limited to the left direction, the lower left direction, and the down direction, and may be determined as a direction having one of various angles.

As illustrated in FIG. 13, the predetermined direction with respect to searching for the first pixel may be separately determined for each of blocks 1300, 1302, 1304, 1306, 1308, and 1310. The predetermined direction in the blocks 1300 and 1302 may be a left direction, the predetermined direction in the block 1304 may be a right direction, the predetermined direction in the block 1306 may be a lower left direction, the predetermined direction in the block 1308 may be a down direction, and the predetermined direction in the block 1310 may be a lower right direction. According to an embodiment, the predetermined direction with respect to searching for the first pixel of a block may be determined based on a preset criteria, and the preset criteria may include a distribution of pixels included in the first pixel region in the block, a determined scanning direction of an adjacent block, or the like.

According to an embodiment, pixels arranged in a predetermined direction from a second pixel are scanned for, and a first found pixel included in a first pixel region may be determined to be a first pixel.

Figure 14:
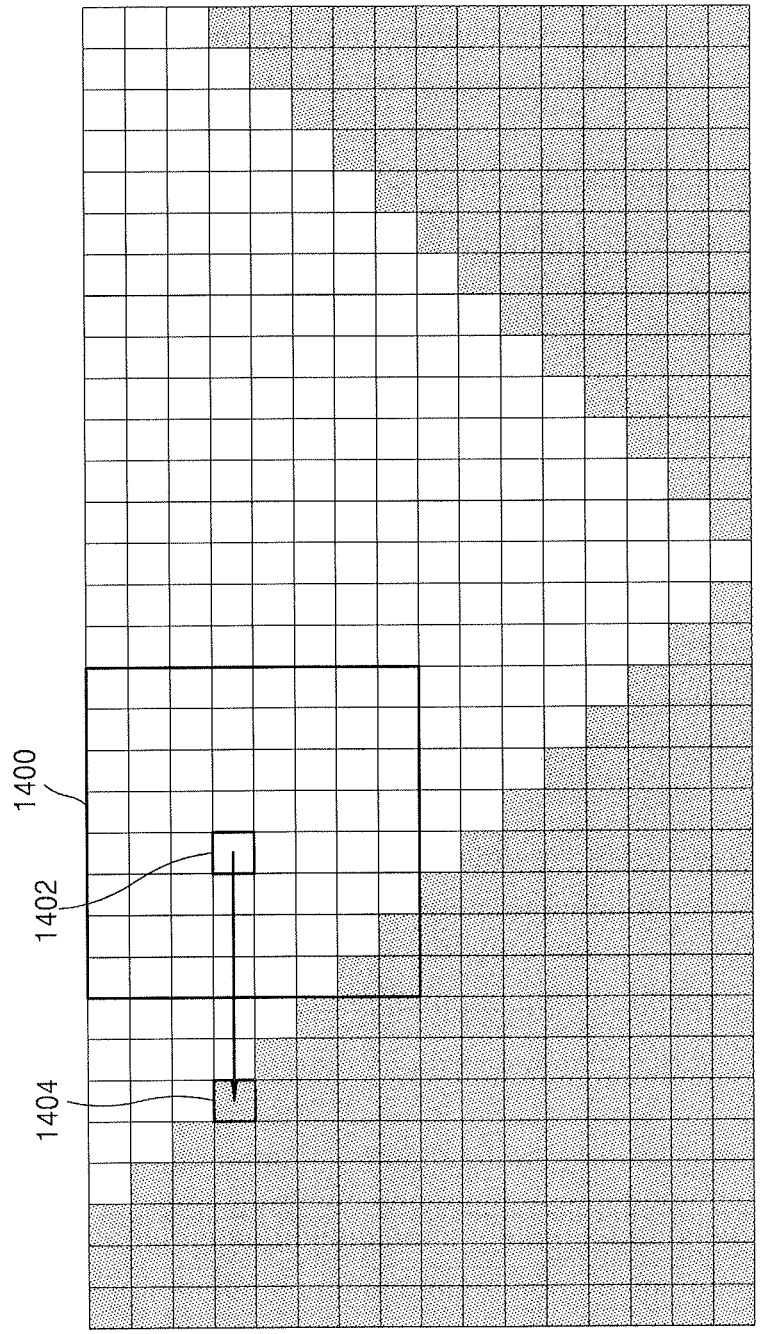
FIG. 14 is a diagram illustrating that a first pixel is searched for, according to an embodiment.

FIG. 14 is a diagram illustrating that a first pixel is searched for, according to an embodiment.

As illustrated in FIG. 14, a block 1400 may include a second pixel 1402 included in a second pixel region, pixels in the left from the second pixel 1402 may be scanned for, and a first found pixel included in a first pixel region may be determined to be a first pixel 1404.

According to an embodiment, pixels may be scanned for in a predetermined direction from a second pixel, and a weighted sum of a first found pixel and a plurality of pixels may be determined to be a pixel value of the first pixel, wherein the first found pixel is included in a first pixel region and the plurality of pixels are adjacent to the first found pixel in the predetermined direction in the first pixel region.

Figure 15:
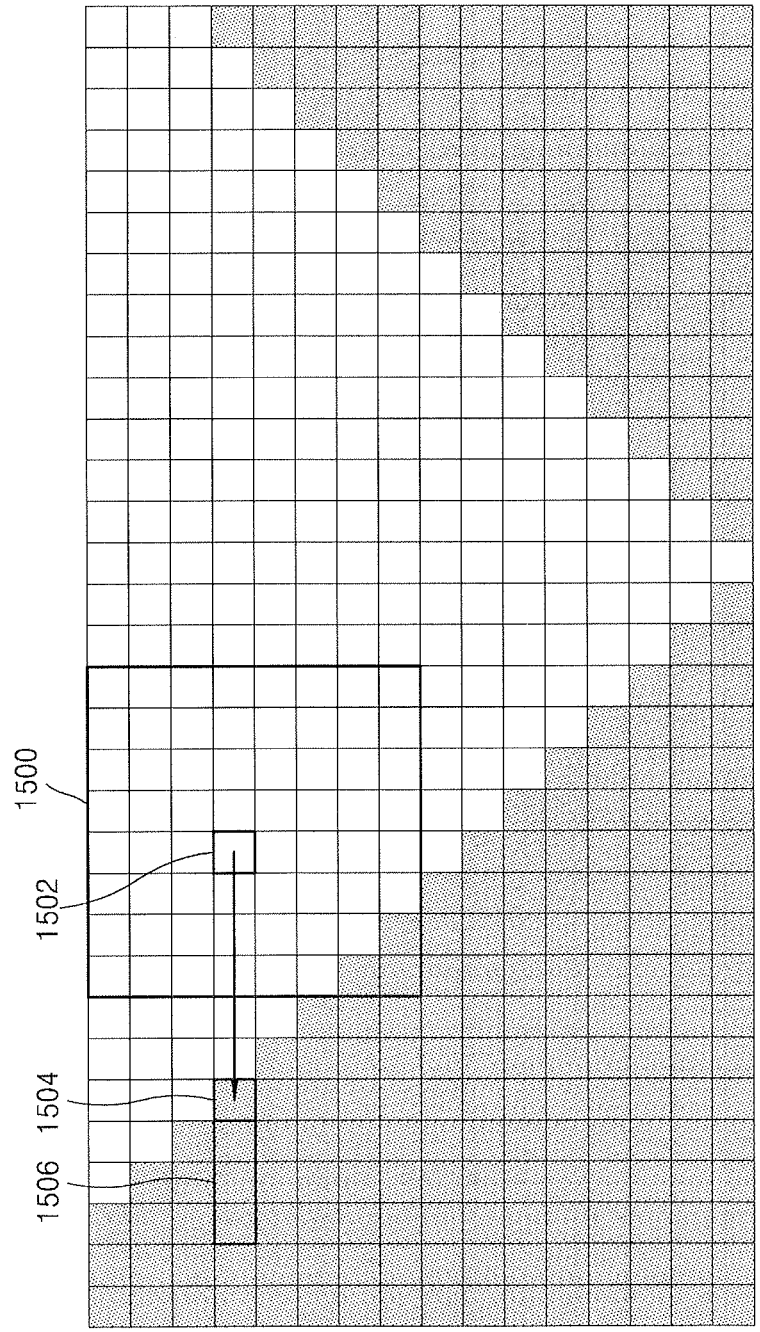
FIG. 15 is a diagram illustrating that a first pixel is searched for, according to another embodiment.

FIG. 15 is a diagram illustrating that a first pixel is searched for, according to an embodiment.

In a similar manner to FIG. 14, referring to FIG. 15, a block 1500 may include a second pixel 1502 included in a second pixel region, pixels in the left of the second pixel 1502 may be scanned for, and a weighted sum of a first found pixel 1504 included in a first pixel region and three pixels 1506 neighboring in a left direction may be calculated. The weighted sum may be calculated by summing values obtained by multiplying different coefficients by respective pixel values of the pixel 1504 and the three pixels 1506 neighboring in the left direction. According to an embodiment, when the predetermined number of pixels does not exist in the first pixel region, the pixels being adjacent to a first found pixel in a predetermined direction, the first found pixel may be determined to be a first pixel, or a pixel value of the first pixel may be determined by using existing adjacent pixels.

According to an embodiment, pixels may be scanned for in at least two directions from a second pixel, and one of pixels that are included in a first pixel region and are first found in the at least two directions may be determined to be a first pixel.

According to another embodiment, pixels may be scanned for in at least two directions from the second pixel, and an average value of pixels that are included in the first pixel region and are first found in the at least two directions may be determined to be a first pixel.

Figure 16:
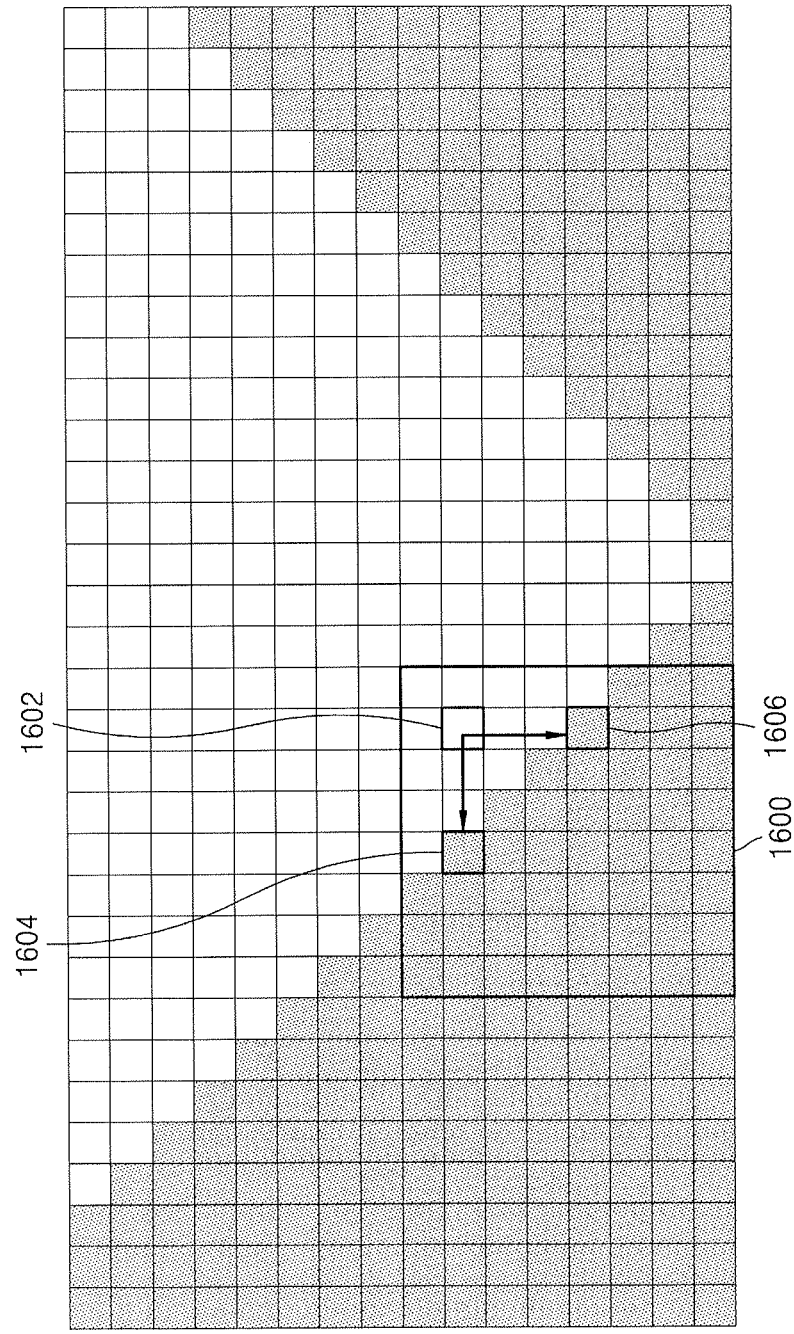
FIG. 16 is a diagram illustrating that pixels are scanned for in two directions, according to an embodiment.

FIG. 16 is a diagram illustrating that pixels are scanned for in two directions, according to an embodiment.

As illustrated in FIG. 16, a block 1600 may include a second pixel 1602 included in a second pixel region, and may scan for pixels in left and down directions from the second pixel 1602. According to an embodiment, at least one of a pixel 1604 and a pixel 1606 may be determined to be a first pixel, wherein the pixel 1604 is first found in the left direction and is included in a first pixel region and the pixel 1606 is first found in the down direction and is included in the first pixel region, and a pixel value of the second pixel 1602 may be substituted with a pixel value of the first pixel. According to another embodiment, an average value of the found pixels 1604 and 1606 may be determined to be a pixel value of the first pixel, and the pixel value of the second pixel 1602 may be determined to be the average value.

Hereinafter, with reference to FIGS. 17 and 18, operations of a video decoding apparatus 1700 and a video decoding method to be performed by the video decoding apparatus 1700 according to an embodiment will now be described. The video decoding apparatus 1700 according to an embodiment may perform the operations that are similar to or inverse to the aforementioned various embodiments with respect to operations of the video encoding apparatus 100.

Figure 17:
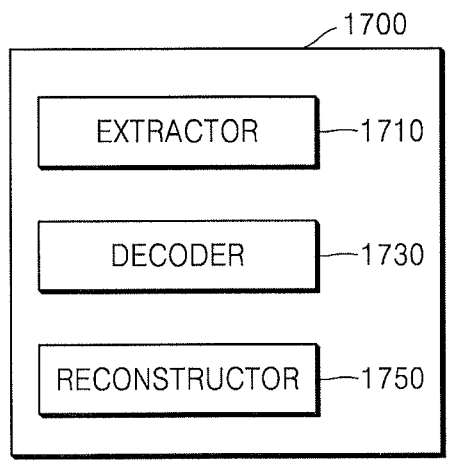
FIG. 17 is a diagram illustrating a video decoding apparatus, according to an embodiment.

FIG. 17 is a diagram illustrating a video decoding apparatus, according to an embodiment.

As illustrated in FIG. 17, the video decoding apparatus 1700 includes an extractor 1710, a decoder 1730, and a reconstructor 1750.

According to an embodiment, the extractor 1710 may extract, from a parsed bitstream, encoded image data of each block having a predetermined size.

According to an embodiment, the decoder 1730 may decode image data of a block including at least one pixel included in a first pixel region and at least one pixel included in a second pixel region, and may reconstruct a rectangular image including the first pixel region and the second pixel region.

According to an embodiment, the decoder 1730 may skip a decoding and reconstructing process with respect to a block including only pixels in the second pixel region. Because residual information about the block including only the pixels in the second pixel region is not parsed, the decoder 1730 may decode the block including only the pixels in the second pixel region, by using transmitted other information such as adjacent block selection information, information indicating a block type, or the like. The pixels included in the block including only the pixels in the second pixel region may be processed as empty pixels not having a value, or may be set as 0 or a predetermined value that is not 0. The block including only the pixels in the second pixel region is processed as a skip block and does not have a change in pixel values on a time axis, therefore, the number of bits may be saved in encoding/decoding. The extractor 1710 may extract, from the parsed bitstream, information indicating whether a block includes only pixels in the second pixel region.

According to an embodiment, the reconstructor 1750 may reconstruct a three-dimensional image by rendering a projected image corresponding to the first pixel region included in the rectangular image.

According to an embodiment, the reconstructor 1750 may define the first pixel region and the second pixel region by specifying the first pixel region based on preset information, and determining pixels outside the first pixel region to be the second pixel region. The reconstructor 1750 may delete the second pixel region included in the reconstructed rectangular image and generate the projected image corresponding to the first pixel region, and then may reconstruct the three-dimensional image by rendering the generated projected image.

Figure 18:
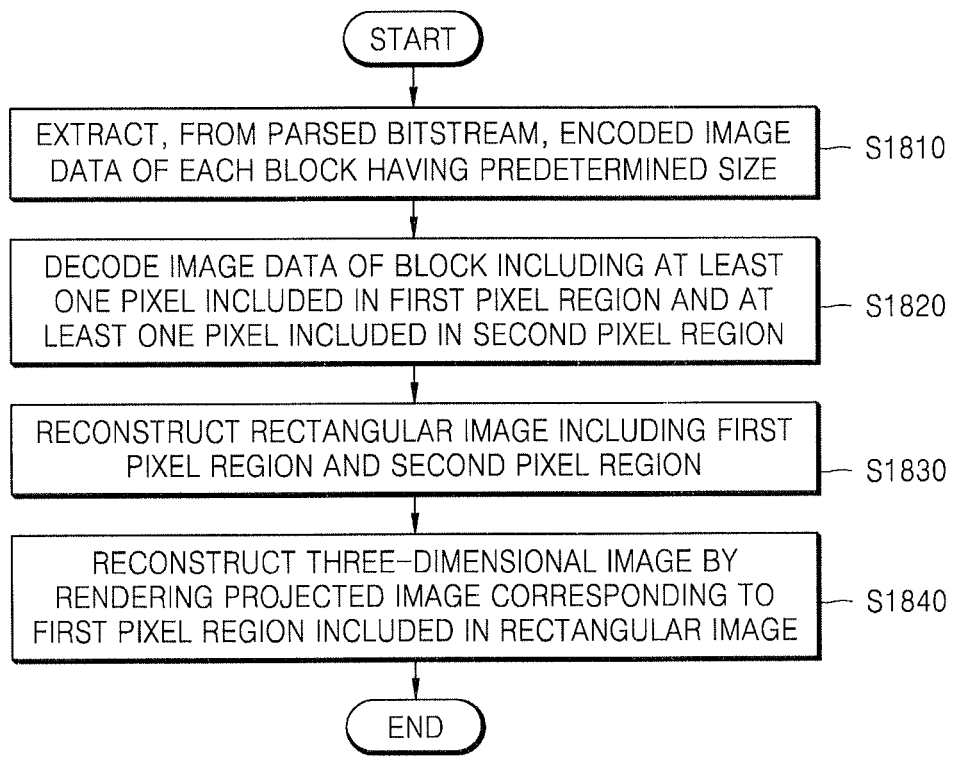
FIG. 18 is a flowchart illustrating a video decoding method, according to an embodiment.

FIG. 18 is a flowchart illustrating a video decoding method, according to an embodiment.

Referring to FIG. 18, in operation S1810, the extractor 1710 of the video decoding apparatus 1700 may extract, from a parsed bitstream, encoded image data of each block having a predetermined size.

Referring to FIG. 18, in operation S1820, the decoder 1730 of the video decoding apparatus 1700 may decode the image data of a block including at least one pixel included in a first pixel region and at least one pixel included in a second pixel region.

Referring to FIG. 18, in operation S1830, the decoder 1730 of the video decoding apparatus 1700 may reconstruct a rectangular image including the first pixel region and the second pixel region.

Referring to FIG. 18, in operation S1840, the reconstructor 1750 of the video decoding apparatus 1700 may reconstruct a three-dimensional image by rendering a projected image corresponding to the first pixel region included in the rectangular image.

Various embodiments of the disclosure have been particularly shown and described. The various embodiments may each be independent or may be combined with each other. It will be understood by those of ordinary skill in the art that various changes in form and details may be made therein without departing from the spirit and scope of the disclosure. The embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The embodiments of the present disclosure can be written as computer-executable programs and can be implemented in general-use digital computers that execute the programs by using a computer-readable recording medium. Examples of the computer-readable recording medium include magnetic storage media (e.g., ROM, floppy disks, hard disks, etc.), optical recording media (e.g., CD-ROMs, or DVDs), etc.

The invention claimed is:

1. A video encoding method comprising:
   obtaining a projected image by projecting a three-dimensional image onto a polyhedron;
   generating a rectangular image comprising a first pixel region and a second pixel region, the first pixel region corresponding to the projected image;
   selecting a block comprising at least one pixel comprised in the first pixel region and at least one pixel comprised in the second pixel region, the block being from among blocks split from the rectangular image and each block having a predetermined size;
   searching for a first pixel comprised in the first pixel region, the first pixel being located in a predetermined direction from a second pixel comprised in the second pixel region comprised in the selected block;
   substituting a pixel value of the second pixel with a pixel value of the first pixel; and
   encoding the selected block,
   wherein the predetermined direction is determined based on at least one of a distribution of pixels included in the first pixel region in the selected block and a determined scanning direction of an adjacent block of the selected block.

2. The video encoding method of claim 1, further comprising skipping encoding with respect to a block comprising only pixels comprised in the second pixel region.

3. The video encoding method of claim 1, wherein the predetermined direction is determined only with respect to the selected block.

4. The video encoding method of claim 1, wherein the searching for the first pixel comprises sequentially scanning for pixels arranged in the predetermined direction from the second pixel, and determining a first found pixel in the first pixel region to be the first pixel.

5. The video encoding method of claim 1, wherein the searching for the first pixel comprises sequentially scanning for pixels arranged in the predetermined direction from the second pixel, and determining a weighted sum of a first found pixel and a plurality of pixels to be a pixel value of the first pixel, wherein the first found pixel is comprised in the first pixel region and the plurality of pixels are adjacent to the first found pixel in the predetermined direction in the first pixel region.

6. The video encoding method of claim 1, wherein the searching for the first pixel comprises scanning for pixels in at least two directions from the second pixel, and determining one of pixels to be the first pixel, the pixels being first found in the at least two directions in the first pixel region.

7. The video encoding method of claim 1, wherein the searching for the first pixel comprises scanning for pixels in at least two directions from the second pixel, and determining an average value of pixels to be the pixel value of the first pixel, the pixels being first found in the at least two directions in the first pixel region.

8. The video encoding method of claim 1, wherein the obtaining of the projected image by projecting the three-dimensional image onto the polyhedron comprises obtaining the projected image by projecting the three-dimensional image onto a flat pattern view of the polyhedron.

9. The video encoding method of claim 1, wherein the obtaining of the projected image by projecting the three-dimensional image onto the polyhedron comprises obtaining the projected image by projecting the three-dimensional image onto the polyhedron and then projecting images projected onto the polyhedron onto at least one flat surface outside of the polyhedron.

10. The video encoding method of claim 1, wherein the polyhedron comprises a polyhedron composed of at least one triangle.

11. A video encoding apparatus comprising:
    an obtainer configured to obtain a projected image by projecting a three-dimensional image to a polyhedron;
    a generator configured to generate a rectangular image comprising a first pixel region and a second pixel region, the first pixel region corresponding to the projected image; and
    an encoder configured to select a block comprising at least one pixel comprised in the first pixel region and at least one pixel comprised in the second pixel region, the block being from among blocks split from the rectangular image and each block having a predetermined size, to search for a first pixel comprised in the first pixel region, the first pixel being located in a predetermined direction from a second pixel comprised in the second pixel region comprised in the selected block, to substitute a pixel value of the second pixel with a pixel value of the first pixel and to encode the selected block,
    wherein the predetermined direction is determined based on at least one of a distribution of pixels included in the first pixel region in the selected block and a determined scanning direction of an adjacent block of the selected block.

12. The video encoding apparatus of claim 11, wherein the encoder is further configured to skip encoding with respect to a block comprising only pixels comprised in the second pixel region.

13. A video decoding method comprising:
    extracting, from a parsed bitstream, encoded image data of each of blocks each having a predetermined size;
    decoding the image data of a block comprising at least one pixel comprised in a first pixel region and at least one pixel comprised in a second pixel region;
    reconstructing a rectangular image comprising the first pixel region and the second pixel region; and
    reconstructing a three-dimensional image by rendering a projected image corresponding to the first pixel region comprised in the rectangular image,
    wherein a pixel value of the at least one pixel in the second pixel region is the same as a pixel value of the at least one pixel in the first pixel region, the at least one pixel in the first pixel region being located in a predetermined direction from the at least one pixel in the second pixel region, and wherein the predetermined direction is determined based on at least one of a distribution of pixels included in the first pixel region the block and a determined scanning direction of an adjacent block of the block.

* * * * *